US010281670B2

(12) United States Patent
Vaughn et al.

(10) Patent No.: US 10,281,670 B2
(45) Date of Patent: May 7, 2019

(54) FIBER OPTIC TERMINAL ENCLOSURE

(71) Applicant: AFL TELECOMMUNICATIONS LLC, Duncan, SC (US)

(72) Inventors: Roger Vaughn, Greer, SC (US); Ted Lichoulas, Simpsonville, SC (US); Wilfred Courchaine, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/542,572

(22) PCT Filed: Jan. 12, 2016

(86) PCT No.: PCT/US2016/013053
§ 371 (c)(1),
(2) Date: Jul. 10, 2017

(87) PCT Pub. No.: WO2016/115137
PCT Pub. Date: Jul. 21, 2016

(65) Prior Publication Data
US 2017/0371118 A1 Dec. 28, 2017

Related U.S. Application Data

(60) Provisional application No. 62/102,407, filed on Jan. 12, 2015.

(51) Int. Cl.
*G02B 6/38* (2006.01)
*G02B 6/44* (2006.01)

(52) U.S. Cl.
CPC ......... *G02B 6/4441* (2013.01); *G02B 6/3825* (2013.01); *G02B 6/3879* (2013.01); *G02B 6/3897* (2013.01); *G02B 6/3887* (2013.01)

(58) Field of Classification Search
CPC .. G02B 6/3893; G02B 6/3825; G02B 6/3897; G02B 6/3885; G02B 6/3887; G02B 6/38
See application file for complete search history.

(56) References Cited

U.S. PATENT DOCUMENTS 5,042,901 A 8/1991 Merriken et al.
5,073,044 A 12/1991 Egner et al.
(Continued)

FOREIGN PATENT DOCUMENTS

EP 0481954 A1 4/1992
EP 0505104 A1 9/1992
(Continued)

OTHER PUBLICATIONS

AFL Telecommunications LLC, International Patent Application No. PCT/US2016/061334; International Search Report; dated Jan. 23, 2017; (1 page).
(Continued)

*Primary Examiner* — Jennifer Doan
(74) *Attorney, Agent, or Firm* — Dority & Manning, P.A.

(57) ABSTRACT

A terminal enclosure with a terminal base with a hole; a terminal lid with an adapter mounting face and a mounting hole in the mounting face; a right angle transition body with first and second ends; an adapter which passes through the mounting hole and is mounted to the mounting face; and a fiber optic cable, attached to the second end of the right angle transition body, with an optical fiber with a connector at one end. The mounting face is formed at an angle α, between 0 and 180 degrees, from a plane formed where the terminal lid and base meet. The optical fiber connector is connected to the adapter. The first end of the right angle transition body passes through the terminal base hole. The terminal base and terminal lid are configured to be attached together.

9 Claims, 20 Drawing Sheets

(56) References Cited

U.S. PATENT DOCUMENTS

| | | |
|---|---|---|
| 5,115,105 A | 5/1992 | Gallusser et al. |
| 5,121,458 A | 6/1992 | Nilsson et al. |
| 5,125,060 A | 6/1992 | Edmundson |
| 5,133,038 A | 7/1992 | Zipper |
| 5,133,039 A | 7/1992 | Dixit |
| 5,247,135 A | 9/1993 | Rebers et al. |
| 5,267,122 A | 11/1993 | Glover et al. |
| 5,440,665 A | 8/1995 | Ray et al. |
| 5,495,549 A | 2/1996 | Schneider et al. |
| 5,509,099 A | 4/1996 | Hermsen et al. |
| 5,528,718 A | 6/1996 | Ray et al. |
| 5,636,310 A | 6/1997 | Walles |
| 5,778,122 A | 7/1998 | Giebel et al. |
| 5,812,728 A | 9/1998 | Wanamaker |
| 5,828,807 A | 10/1998 | Tucker et al. |
| 5,892,870 A | 4/1999 | Fingler et al. |
| 6,061,492 A | 5/2000 | Strause et al. |
| 6,152,767 A | 11/2000 | Roosen et al. |
| 6,292,614 B1 | 9/2001 | Smith et al. |
| 6,427,035 B1 | 7/2002 | Mahony |
| 6,493,500 B1 | 12/2002 | Oh et al. |
| 6,579,014 B2 | 6/2003 | Melton et al. |
| 6,614,980 B1 | 9/2003 | Mahony |
| 6,621,975 B2 | 9/2003 | Laporte et al. |
| 6,695,486 B1 | 2/2004 | Falkenberg |
| 6,766,094 B2 | 7/2004 | Smith et al. |
| 6,777,617 B2 | 8/2004 | Berglund et al. |
| 6,798,967 B2 | 9/2004 | Battey et al. |
| 6,819,842 B1 | 11/2004 | Vogel et al. |
| 6,856,748 B1 | 2/2005 | Elkins, II et al. |
| 6,901,200 B2 * | 5/2005 | Schray ................. G02B 6/4453 385/135 |
| 6,926,449 B1 | 8/2005 | Keenum et al. |
| 7,006,739 B2 | 2/2006 | Elkins, II et al. |
| 7,013,074 B2 | 3/2006 | Battey et al. |
| 7,120,347 B2 | 10/2006 | Blackwell, Jr. et al. |
| 7,137,742 B2 | 11/2006 | Theuerkorn et al. |
| 7,228,036 B2 | 6/2007 | Elkins, II et al. |
| 7,244,066 B2 | 7/2007 | Theuerkorn et al. |
| 7,264,402 B2 | 9/2007 | Theuerkorn et al. |
| 7,302,152 B2 | 11/2007 | Luther et al. |
| 7,333,708 B2 | 2/2008 | Blackwell, Jr. et al. |
| 7,346,253 B2 | 3/2008 | Bloodworth et al. |
| 7,356,237 B2 | 4/2008 | Mullaney et al. |
| RE40,358 E | 6/2008 | Thompson et al. |
| 7,394,964 B2 | 7/2008 | Tinucci et al. |
| 7,397,997 B2 | 7/2008 | Ferris et al. |
| 7,444,056 B2 | 10/2008 | Allen et al. |
| 7,480,437 B2 | 1/2009 | Ferris et al. |
| 7,512,304 B2 | 3/2009 | Gronvall |
| 7,539,387 B2 | 5/2009 | Mertesdorf et al. |
| 7,653,282 B2 | 1/2010 | Blackwell, Jr. et al. |
| 7,740,409 B2 | 6/2010 | Bolton |
| 7,751,672 B2 * | 7/2010 | Smith ................. G02B 6/4452 385/134 |
| 7,753,596 B2 | 7/2010 | Cox |
| RE41,777 E | 9/2010 | Thompson et al. |
| 7,844,158 B2 | 11/2010 | Gronvall |
| RE42,258 E | 3/2011 | Thompson et al. |
| RE43,762 E | 10/2012 | Smith et al. |
| 8,363,999 B2 | 1/2013 | Mertesdorf et al. |
| 8,740,477 B2 | 6/2014 | Tamura |
| 8,774,585 B2 | 7/2014 | Kowalczyk |
| 9,606,320 B2 | 3/2017 | Wang |
| 2002/0150371 A1 | 10/2002 | Battey et al. |
| 2005/0163448 A1 | 7/2005 | Blackwell |
| 2005/0213921 A1 | 9/2005 | Mertesdorf et al. |
| 2005/0281510 A1 | 12/2005 | Vo |
| 2006/0093303 A1 | 5/2006 | Reagan |
| 2006/0147172 A1 | 7/2006 | Luther |
| 2006/0269208 A1 | 11/2006 | Allen |
| 2006/0285811 A1 | 12/2006 | Kowalczyk |
| 2007/0237484 A1 | 10/2007 | Reagan |
| 2008/0152293 A1 | 6/2008 | Knecht |
| 2009/0074369 A1 | 3/2009 | Bolton |
| 2009/0226181 A1 | 9/2009 | Fingler |
| 2009/0238520 A1 | 9/2009 | Wouters |
| 2009/0317047 A1 | 12/2009 | Smith |
| 2011/0097050 A1 | 4/2011 | Blackwell, Jr. |
| 2013/0022328 A1 | 1/2013 | Gronvall et al. |
| 2013/0108227 A1 | 5/2013 | Conner |
| 2013/0114930 A1 | 5/2013 | Smith |
| 2013/0146355 A1 | 6/2013 | Strasser |
| 2014/0099061 A1 | 4/2014 | Isenhour |

FOREIGN PATENT DOCUMENTS

| | | |
|---|---|---|
| JP | S58105114 A | 6/1983 |
| JP | 2003177254 A | 6/2003 |
| WO | WO2016/115137 A1 | 7/2016 |

OTHER PUBLICATIONS

Multilink Inc.; Muitilink Innovation At Work installation Instmetions for Fiber Tap Model Codes FT-8D-965-032-10 Revision 1; 2014.

AFL Telecommunications LLC; International Patent Application No. PCT/US2016/013053; International Search Report; dated Mar. 4, 2016; (1 page).

AFL Telecommunications LLC, European Patent Application No. EP16737737, Supplementary European Search Report; dated May 31, 2018; (2 pages).

* cited by examiner

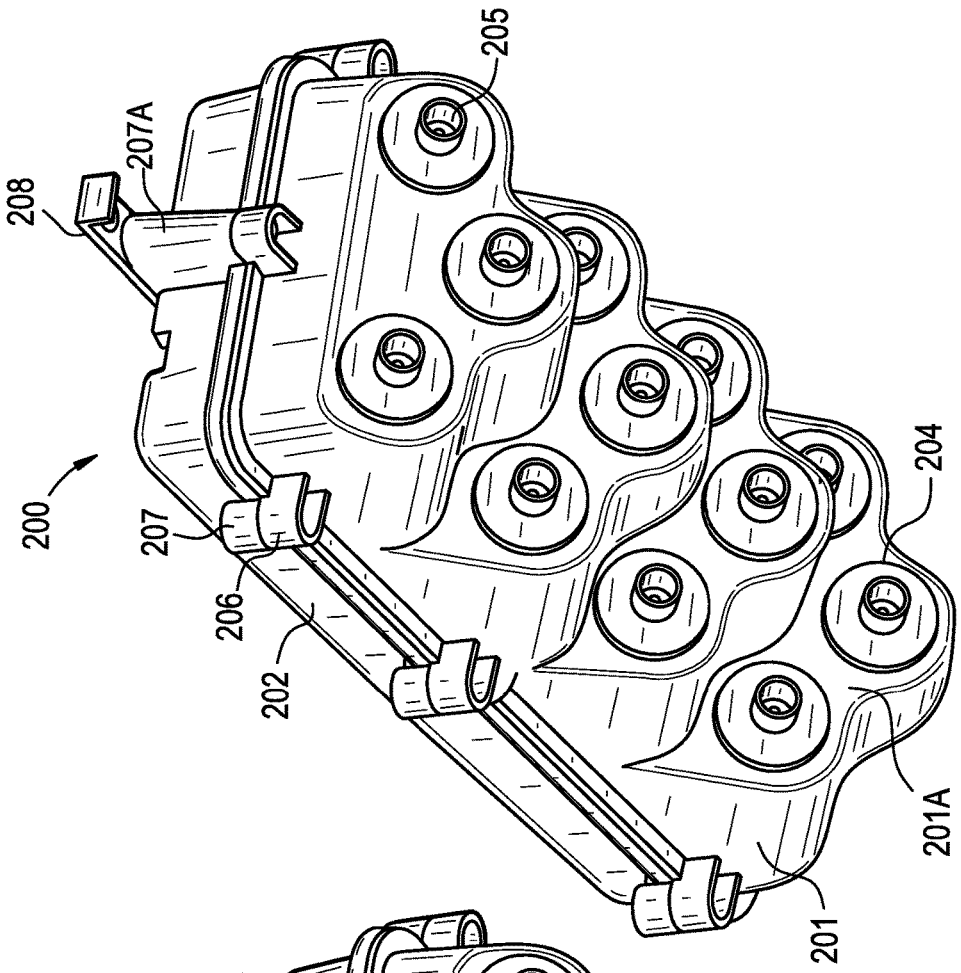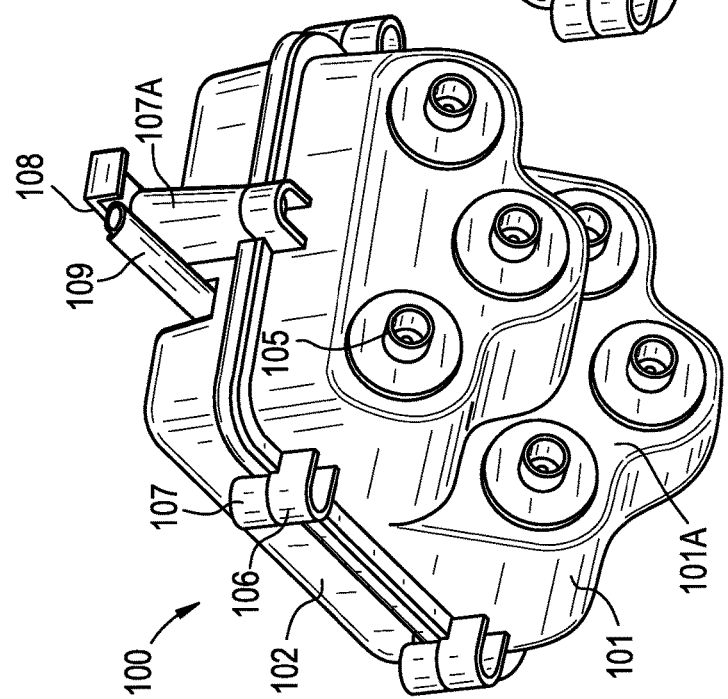

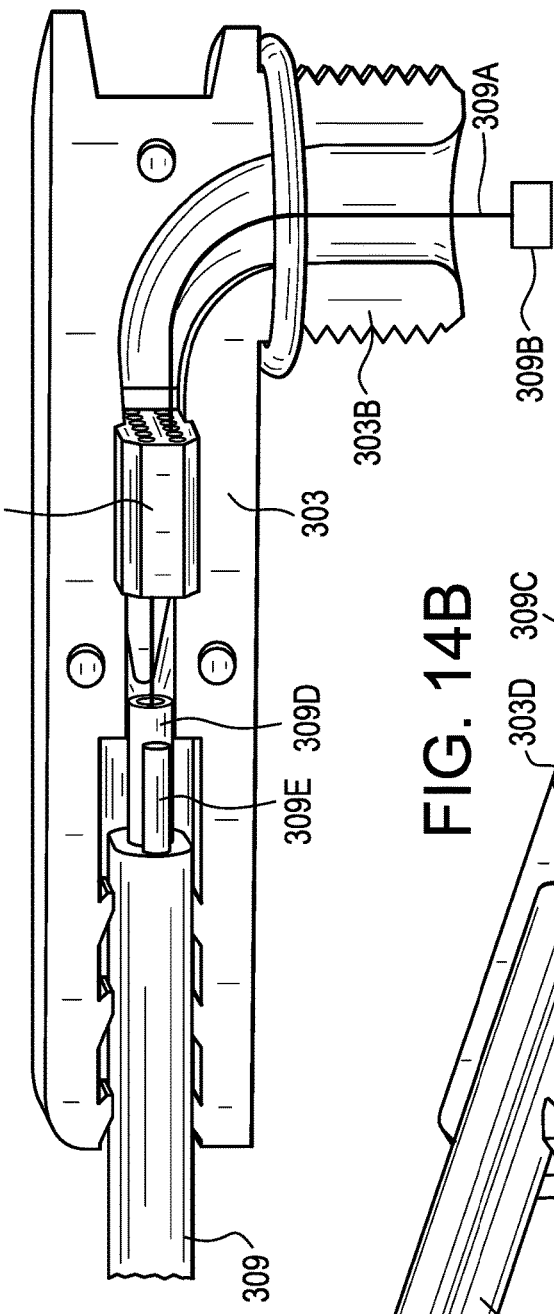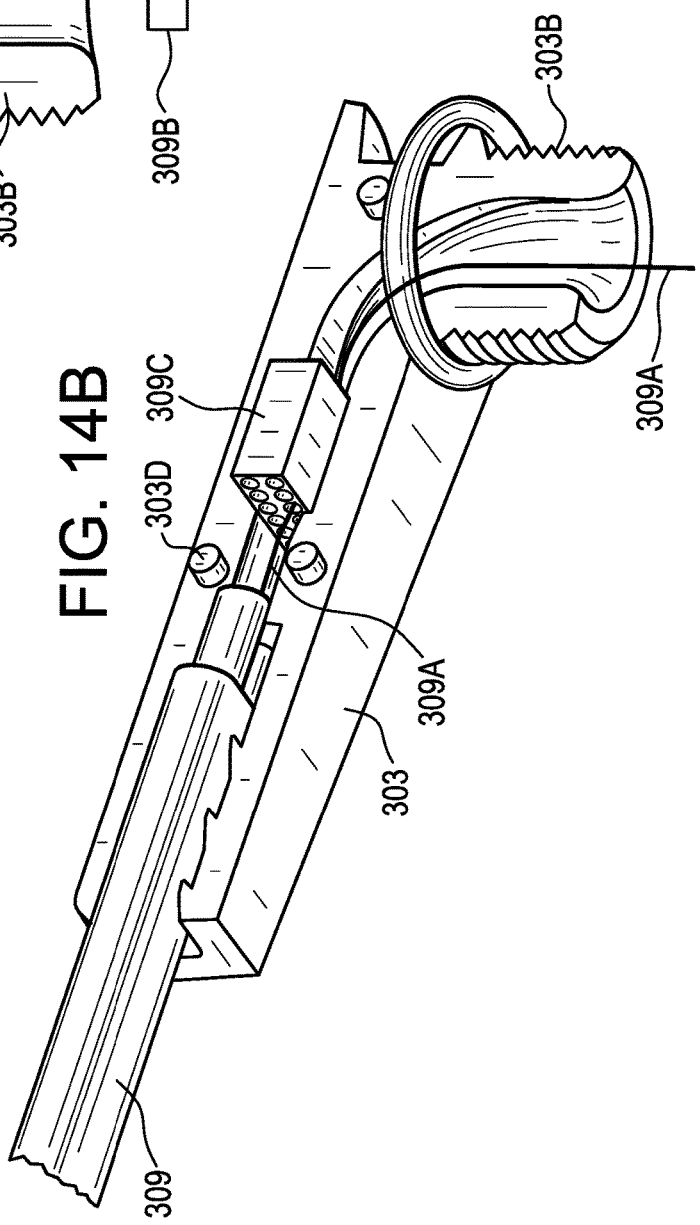

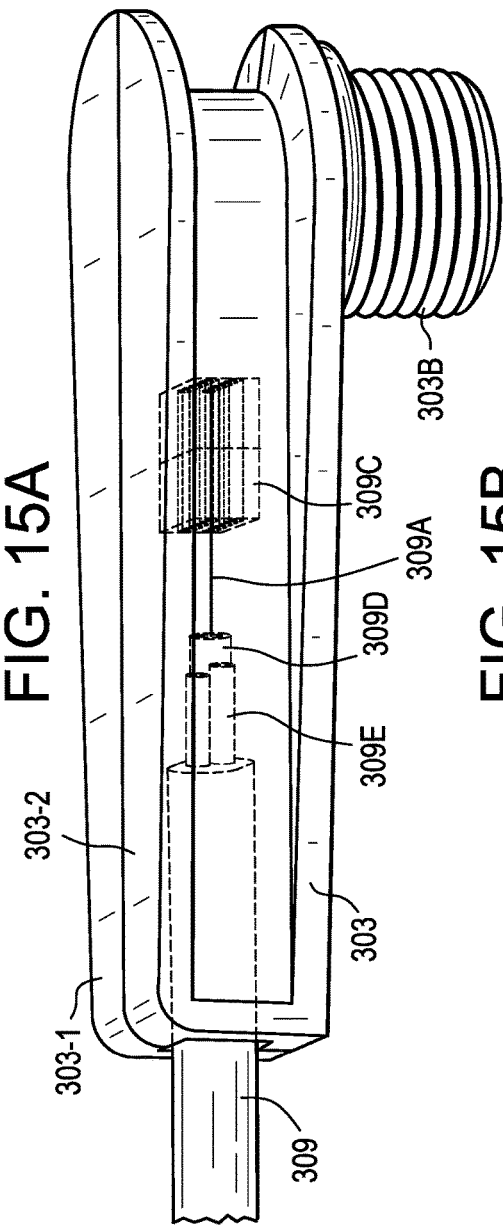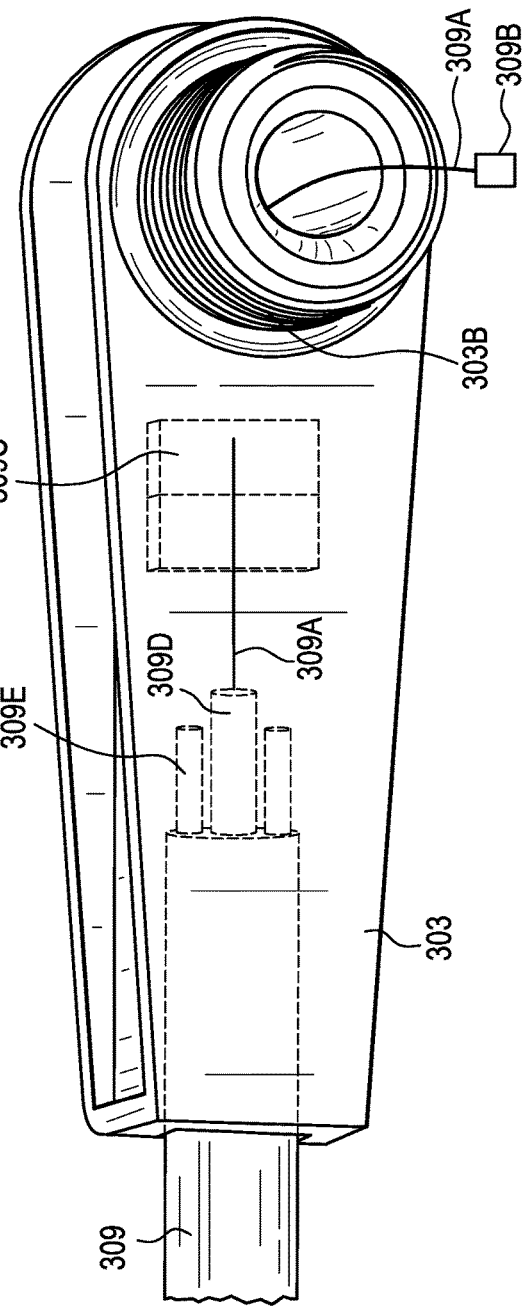

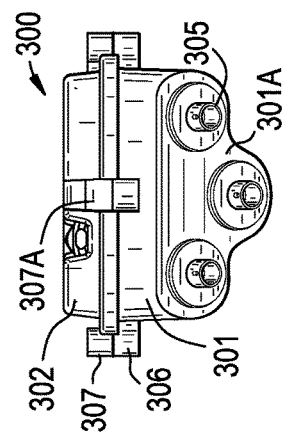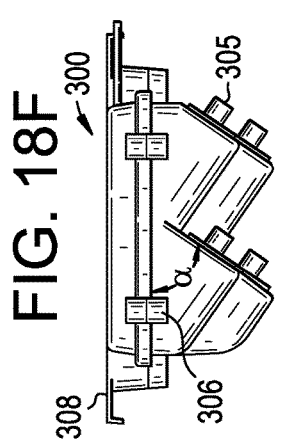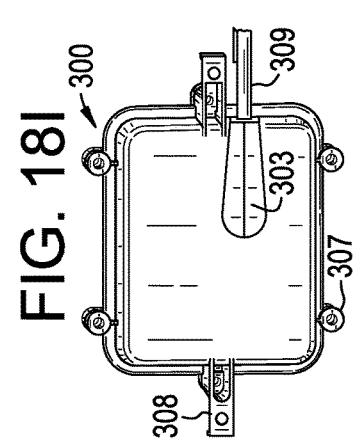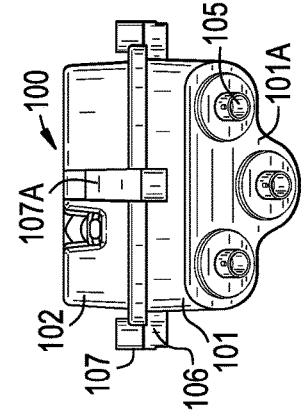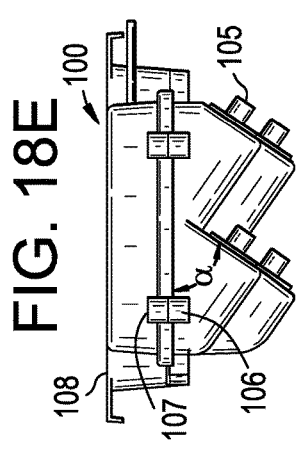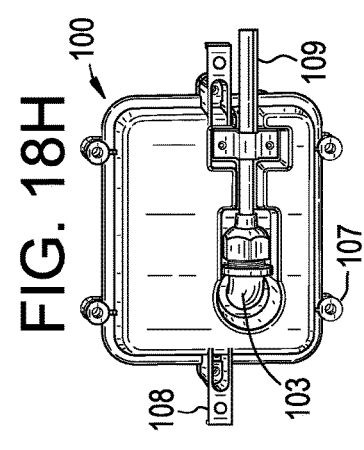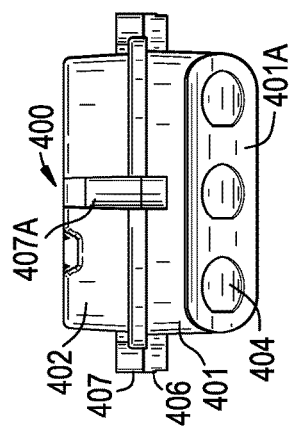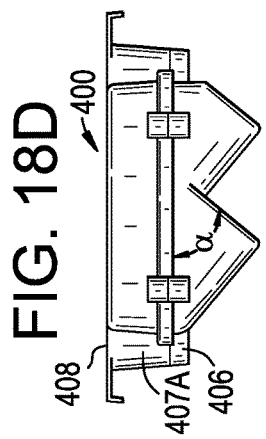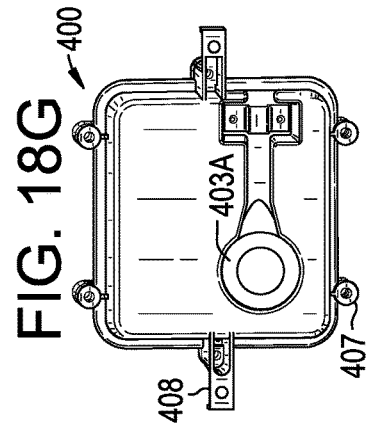

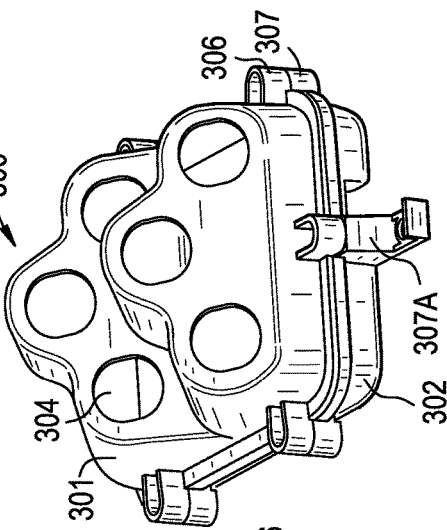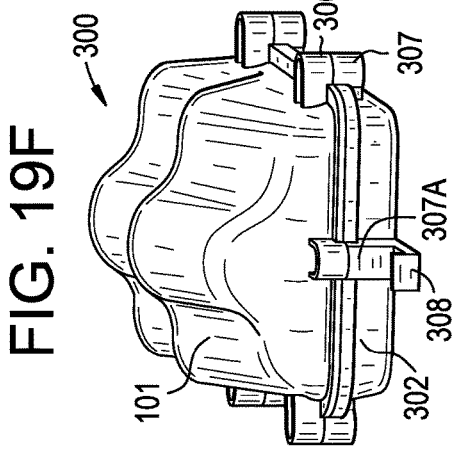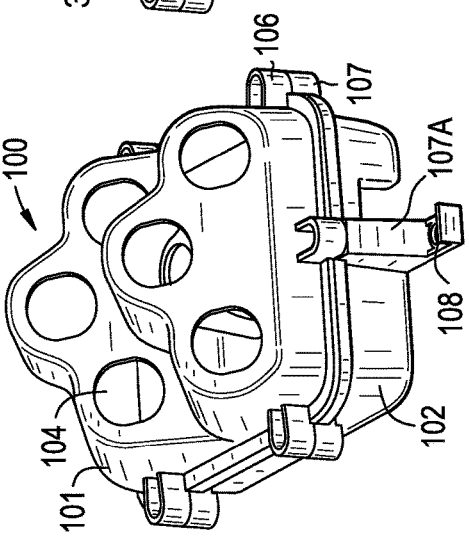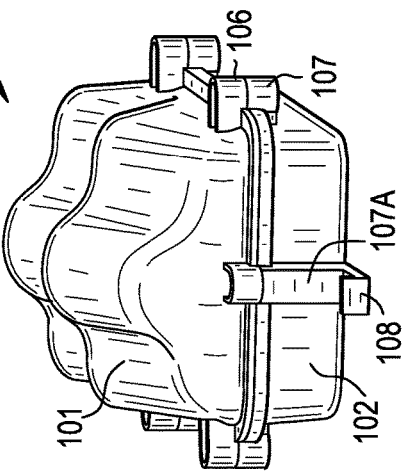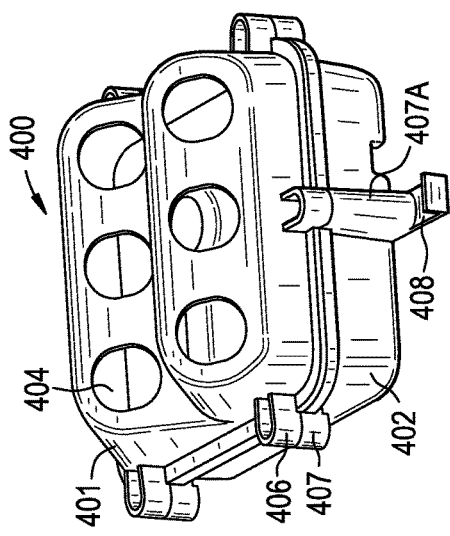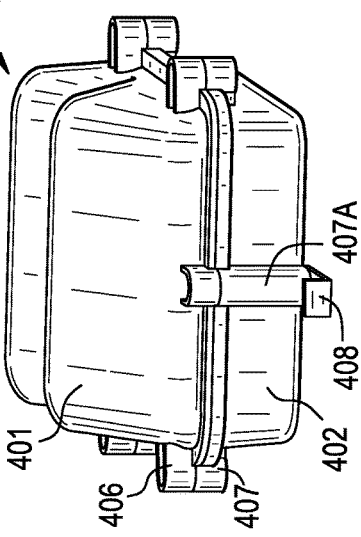

FIBER OPTIC TERMINAL ENCLOSURE

CROSS-REFERENCE TO RELATED APPLICATIONS

This application is based upon and claims the benefit of priority from U.S. Provisional Patent Application No. 62/102,407, filed Jan. 12, 2015 in the United States Patent and Trademark Office, and as a U.S. national stage filing of International Application No. PCT/US2016/013053 having an international filing date of Jan. 12, 2016, the disclosures of both of which are incorporated by reference herein in their entireties.

BACKGROUND

1. Field

The invention is related to a fiber optic terminal enclosure and more particularly to a terminal enclosure that can be used for hardened fiber optic adapters.

2. Related Art

Fiber to the home is a desirable broadband deployment method that holds the promise of providing the greatest amount of bandwidth for future applications. One method of deployment utilizes a hardened fiber optic connector design. These connectors terminate at a enclosure on one end and to the home on the other. At the enclosure termination, the input cable must be sealed and transitioned into the enclosure so as to minimize space and provide a secure water tight connection. Current methods utilize bulky heat shrinks and grommets to accomplish this mating.

SUMMARY

Exemplary implementations of the present invention address the problems and/or disadvantages of the current technology/methodology described above. Although the present invention is not required to overcome all of the disadvantages described above, an exemplary implementation of the present invention may address the above disadvantages, and further disadvantages not described above, or may not overcome any of the problems listed above while still providing improved methodology and enhancement to the present art.

In order to design a method of entry in to the enclosure, a unique transition has been conceived to terminate the cable and fan-out the fibers for connectorization and termination within the enclosure. An integrated chip holder allows for easy fan-out from the cable the 900 μm tubing used within the enclosure. Epoxy is used to fill the transition providing water blocking and cable retention. A threaded insert is used to secure the transition in the enclosure. The unique wedge shape of the transition provides additional retention and strain relieves the transition fitting. An O-ring around the threaded fitting seals the transition to the enclosure once secured with internal nut.

Advantages and benefits of the invention include, but are not limited to the following: 1. Integrated fan-out chip allows for easy fiber transition from 250 μm to protected 900 μm furcation. 2. Inherent wedge shape provides additional strain relief. 3. Two piece construction facilitates ease of manufacturing. 4. Transition piece allows for assembly separate from the enclosure also adding in manufacturing process.

One embodiment of the present invention includes a terminal enclosure with a terminal base with a hole; a terminal lid with an adapter mounting face and a mounting hole in the adapter mounting face; a right angle transition body with a first end and a second end; an adapter which passes through the mounting hole and is mounted to the adapter mounting face; and a fiber optic cable, attached to the second end of the right angle transition body, with an optical fiber with a connector at one end. In addition, the adapter mounting face is formed at an angle α, between 0 and 180 degrees, from a plane formed where the terminal lid and terminal base meet. The optical fiber connector is connected to the adapter. The first end of the right angle transition body passes through the terminal base hole. The terminal base and terminal lid are configured to be attached together.

Other features of the present invention include a plurality of mounting faces on the terminal lid, each of the mounting faces includes a plurality of mounting holes and a plurality of adapters pass through the mounting holes and are mounted to the adapter mounting faces.

Other features of the present invention include the right angle transition body having two body halves.

Other features of the present invention include the right angle transition body having a wedge-like shape.

Other features of the present invention include having a pocket in the terminal base such that the right angle transition body can be positioned in the terminal base pocket such that the right angle transition body does not extend beyond a plane formed at the bottom of the terminal base.

Other features of the present invention include the adapter being a hardened fiber optic adapter.

Other features of the present invention include the fiber optic cable having a furcation tube organizer block.

Other features of the present invention include the angle α being approximately 45 degrees, or in a range between 30 and 60 degrees.

BRIEF DESCRIPTION OF THE DRAWING

FIG. 1A shows a perspective view of a first exemplary embodiment of a fiber optic terminal enclosure.

FIG. 1B shows a perspective view of a second exemplary embodiment of a fiber optic terminal enclosure.

FIGS. 14A and 14B show cross-sectional and perspectives views of the right angle transition body of a third exemplary embodiment of a fiber optic terminal enclosure.

FIGS. 15A and 15B show internal views of the right angle transition body of a third exemplary embodiment of a fiber optic terminal enclosure.

FIG. 18A shows an end view of a fourth exemplary embodiment of a fiber optic terminal enclosure.

FIG. 18B shows an end view of a first exemplary embodiment of a fiber optic terminal enclosure.

FIG. 18C shows an end view of a third exemplary embodiment of a fiber optic terminal enclosure.

FIG. 18D shows a side view of a fourth exemplary embodiment of a fiber optic terminal enclosure.

FIG. 18E shows a side view of a first exemplary embodiment of a fiber optic terminal enclosure.

FIG. 18F shows a side view of a third exemplary embodiment of a fiber optic terminal enclosure.

FIG. 18G shows a bottom view of a fourth exemplary embodiment of a fiber optic terminal enclosure.

FIG. 18H shows a bottom view of a first exemplary embodiment of a fiber optic terminal enclosure.

FIG. 18I shows a bottom view of a third exemplary embodiment of a fiber optic terminal enclosure.

FIGS. 19A and 19D show perspective top views of a fourth exemplary embodiment of a fiber optic terminal enclosure.

FIGS. 19B and 19E show perspective top views of a first exemplary embodiment of a fiber optic terminal enclosure.

FIGS. 19C and 19F show perspective top views of a third exemplary embodiment of a fiber optic terminal enclosure.

DETAILED DESCRIPTION

Figure 2:
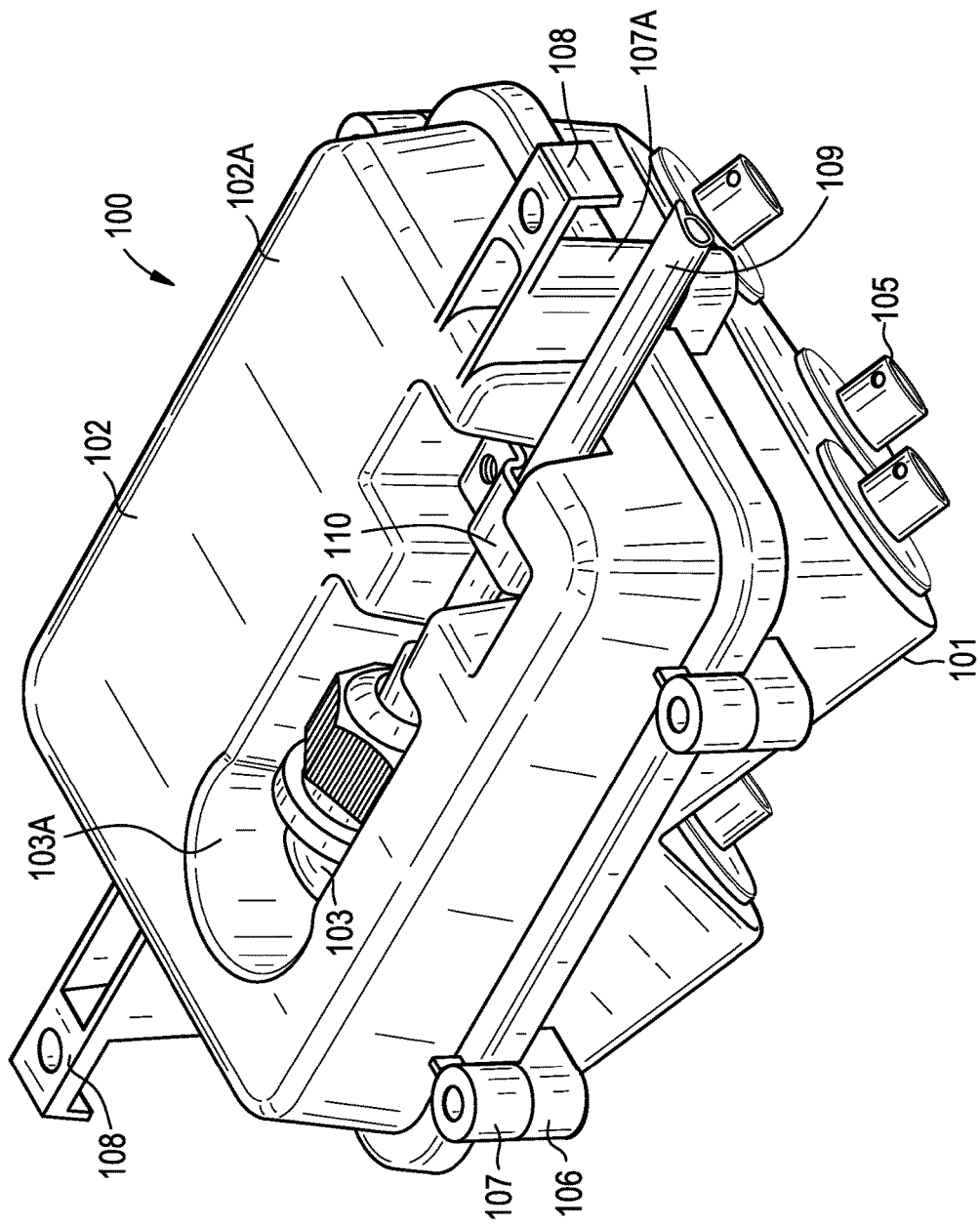
FIG. 2 shows a perspective bottom view of a first exemplary embodiment of a fiber optic terminal enclosure.

The following detailed description is provided to assist the reader in gaining a comprehensive understanding of the apparatuses and/or systems described herein. Various changes, modifications, and equivalents of the systems and/or apparatuses described herein will suggest themselves to those of ordinary skill in the art. Descriptions of well-known functions and structures are omitted to enhance clarity and conciseness.

FIGS. 1A, 2, 3, 4, 5, 6, 7, 17B, 18B, 18E, 18H, 19B, 19E and 19B show views of a first exemplary embodiment of a fiber optic terminal enclosure 100. The fiber optic terminal enclosure 100 includes a six port terminal lid 101 and a terminal base 102. The six port terminal lid 101 of the fiber optic terminal enclosure 100 includes six holes 104 (see FIG. 19B), in adaptor mounting faces 101A, into which hardened fiber optic adaptors (HFOA) 105 are mounted. The adaptor mounting surfaces 101A are formed at an angle α between 0 and 180 degrees, preferably in a range between 30 and 60 degrees and more preferably at approximately 45 degrees, from a plane formed where six port terminal lid 101 and terminal base 102 meet (see FIG. 18E), to allow for easy access and cable management. The holes 104 in each adaptor mounting surfaces 101A are staggered to make access easier. The six port terminal lid 101 also includes fastener shrouds 106. The six port terminal lid 101 also includes an O-ring retainer 111.

The terminal base 102 includes fastener bosses 107 and 107A. Conventional fasteners (not shown) can be used to attach the six port terminal lid 101 to the terminal base 102 at the fastener shrouds 106 and fastener bosses 107, 107A. The terminal base 102 also includes mounting tabs 108 that can be used to mount the fiber optic terminal enclosure 100 to other structures, such as a wall or pole, with conventional fasteners (not shown). The terminal base 102 also includes an O-ring groove 112. Thus, an O-ring (not shown) may be placed in the O-ring groove 112 before attaching the six port terminal lid 101 to the terminal base 102, and the O-ring retainer 111 will hold the O-ring in place such that an appropriate environmental seal can be formed.

The terminal base 102 also includes a pocket 103A for a right angle transition body 103. The pocket 103A may also include a space for a locking clamp 110 that can be used to attach a flat drop cable 109 to the terminal base 102. In a preferred embodiment, said pocket 103A is deep enough so that said right angle transition body 103 does not extend beyond a plane formed at the bottom (102A) of said terminal base 102.

The fiber optic terminal enclosure 100 may be made of thermoplastic materials, such as polycarbonates or polypropylene, or other like materials.

Figure 3:
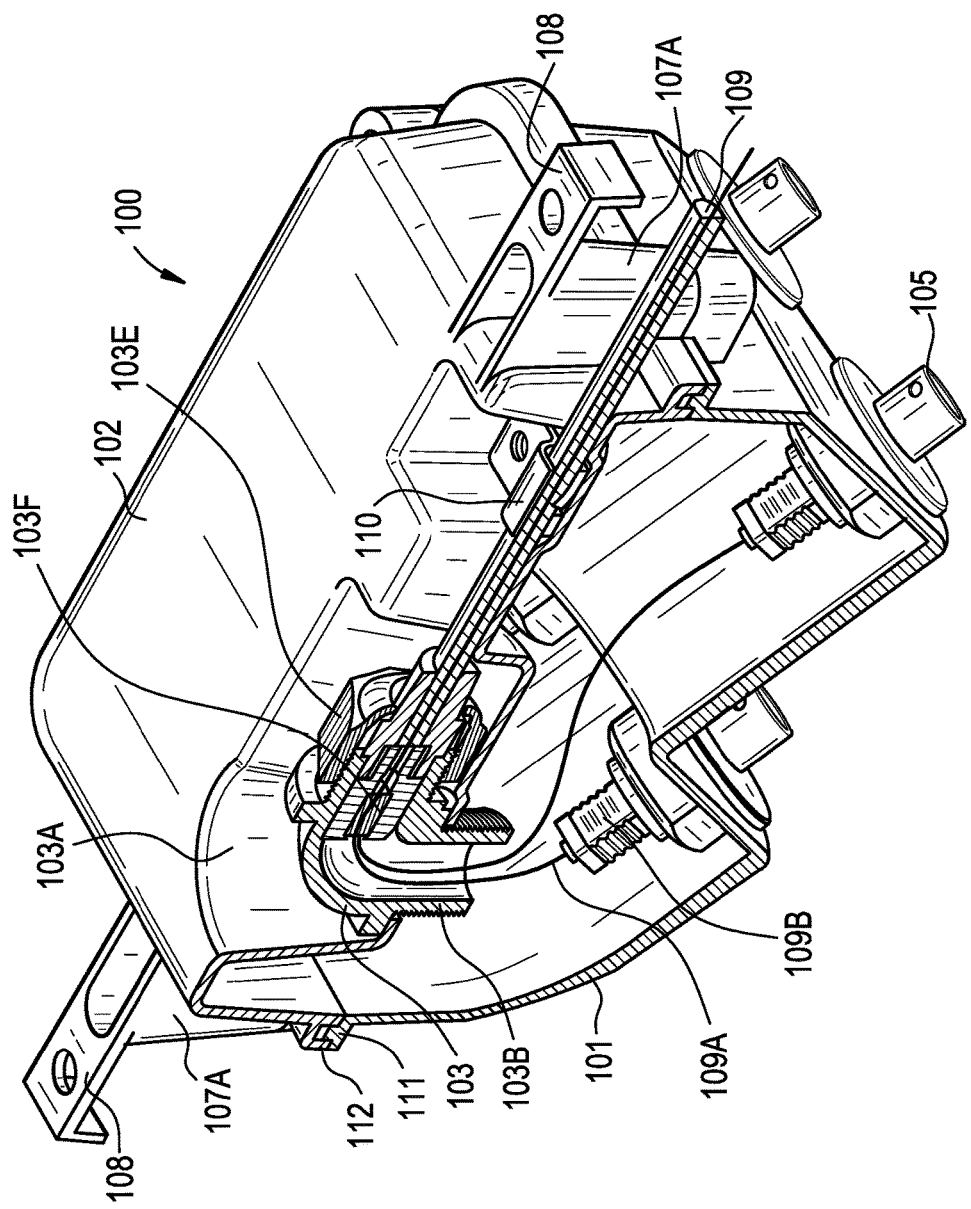
FIG. 3 shows a cross-sectional perspective view of a first exemplary embodiment of a fiber optic terminal enclosure.
Figure 4:
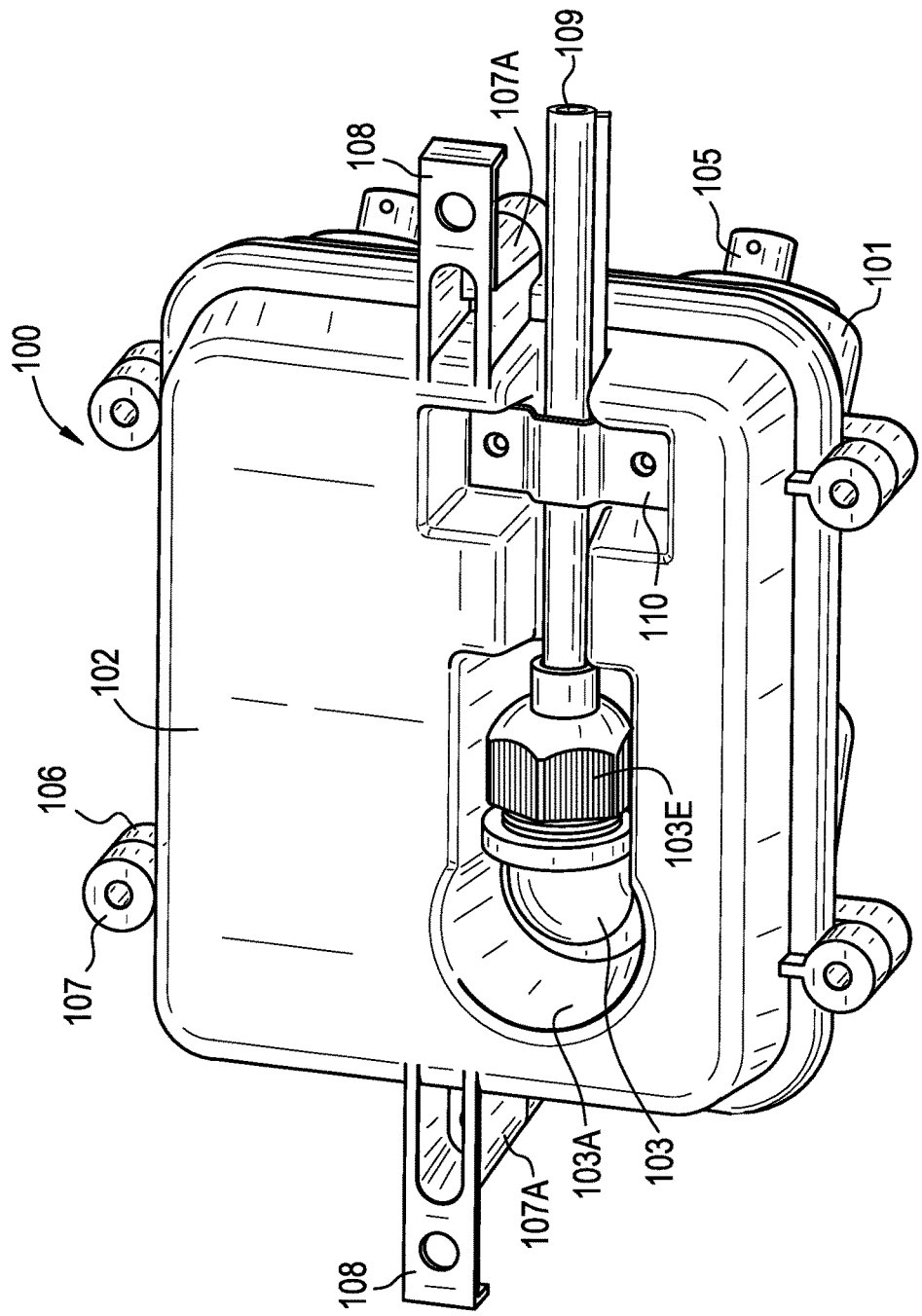
FIG. 4 shows a perspective bottom view of a first exemplary embodiment of a fiber optic terminal enclosure.
Figure 5:
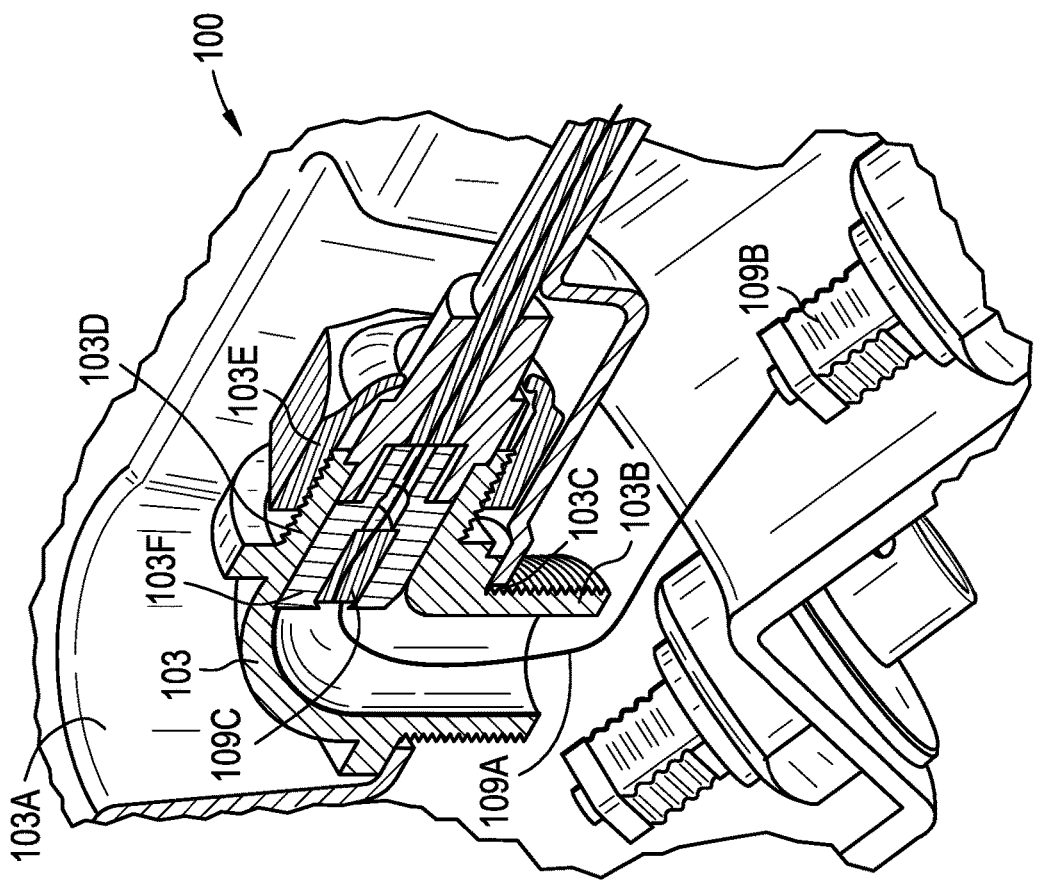
FIG. 5 shows a cross-sectional perspective view of a first exemplary embodiment of a fiber optic terminal enclosure.
Figure 6:
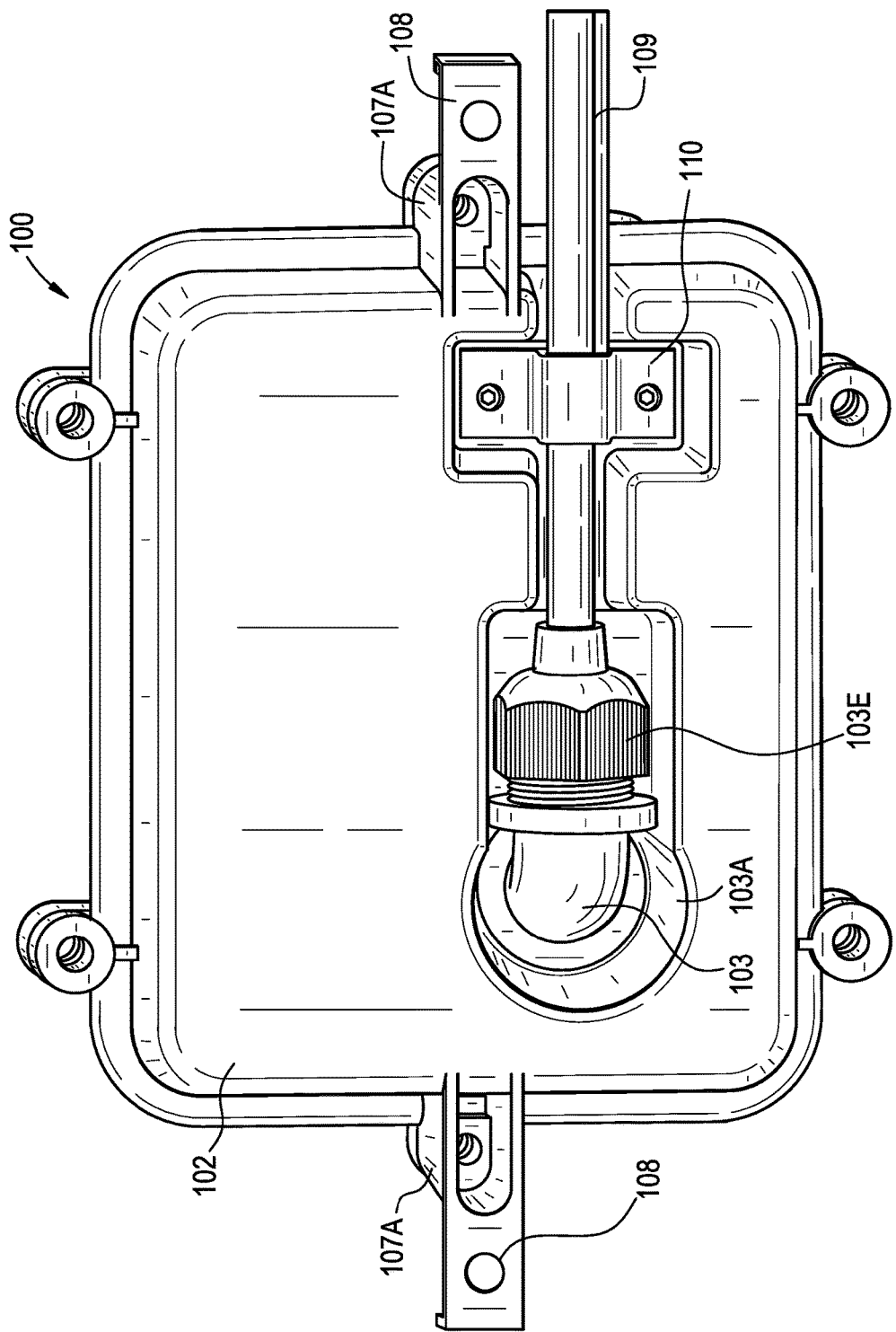
FIG. 6 shows a perspective bottom view of a first exemplary embodiment of a fiber optic terminal enclosure.
Figure 7:
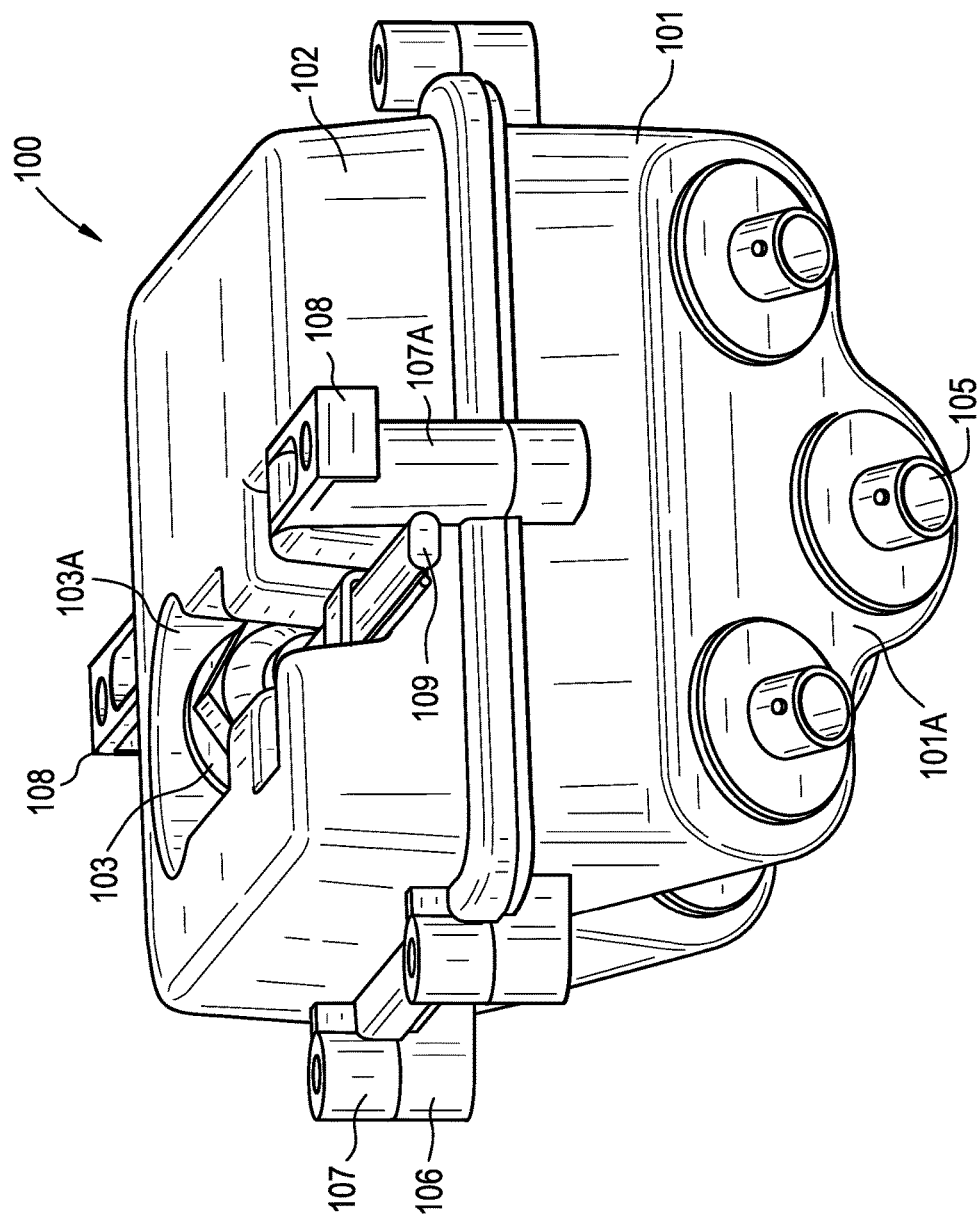
FIG. 7 shows a perspective end view of a first exemplary embodiment of a fiber optic terminal enclosure.

FIGS. 3 and 5 show a cross-sectional views of the first exemplary embodiment of the fiber optic terminal enclosure 100 with the right angle transition body 103. The right angle transition 103 has a first threaded end 103B that is inserted into a hole 103C in the terminal base 102. A nut (not shown) can be threaded on the threaded end 103B to attach the right angle transition body 103 to the terminal base 102. The right angle transition body 103 also has a second threaded end 103D and transition body 103F for holding a furcation tube organizer block 109C. A nut 103E can be threaded on the threaded end 103D to attach a flat drop cable 109 to the right angle transition body 103. The flat drop cable 109 includes optical fibers 109A which go through the furcation tube organizer block 109C. At the end of flat drop cable 109 are connectors 109B that are inserted into HFOAs 105. Flat drop cable 109 may include strength members and a buffer tube for the optical fibers.

In addition, epoxy or other suitable materials may be used to fill the right angle transition body 103 to provide water blocking and cable retention.

Figure 8:
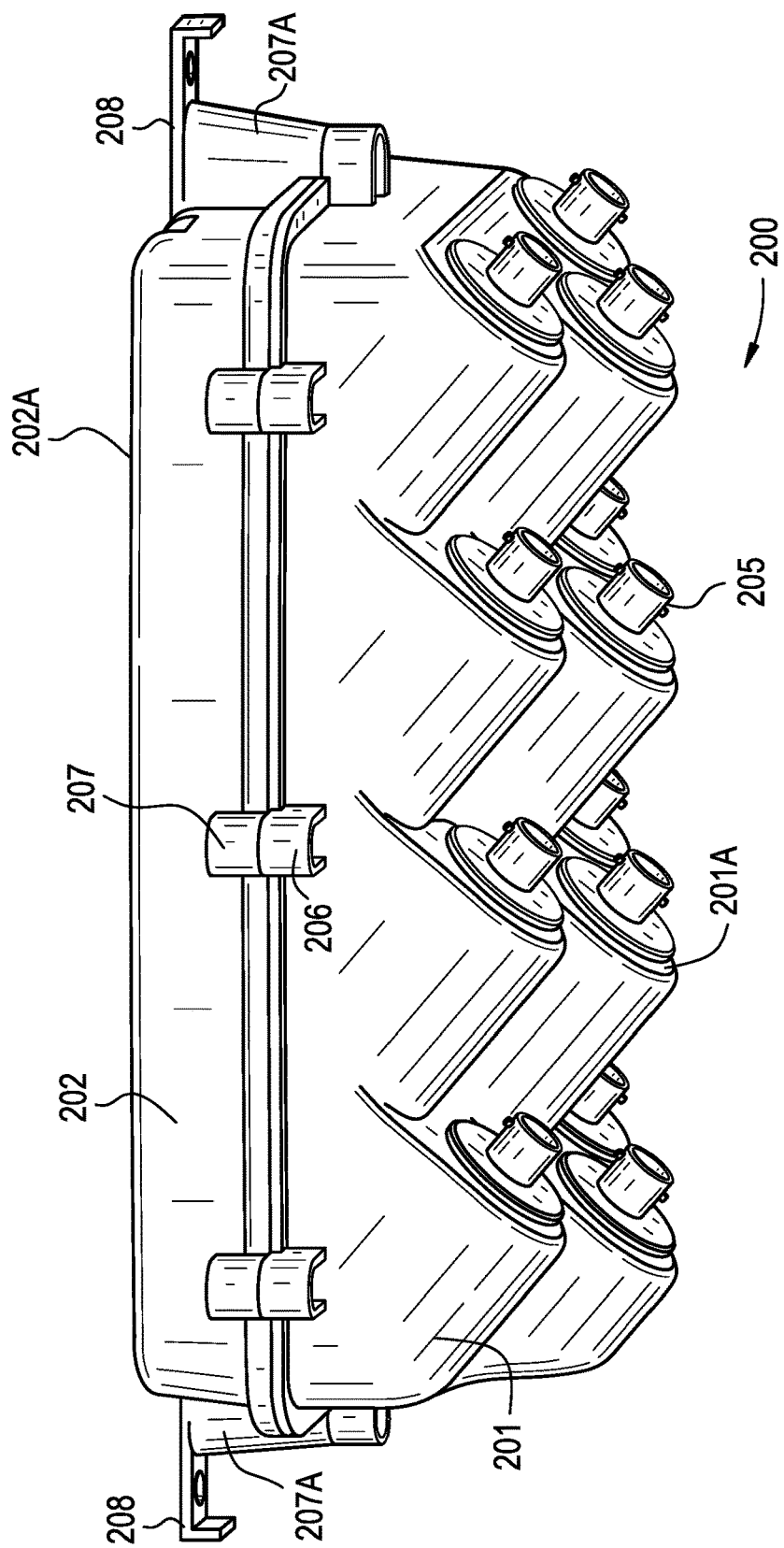
FIG. 8 shows a perspective side view of a second exemplary embodiment of a fiber optic terminal enclosure.
Figure 9:
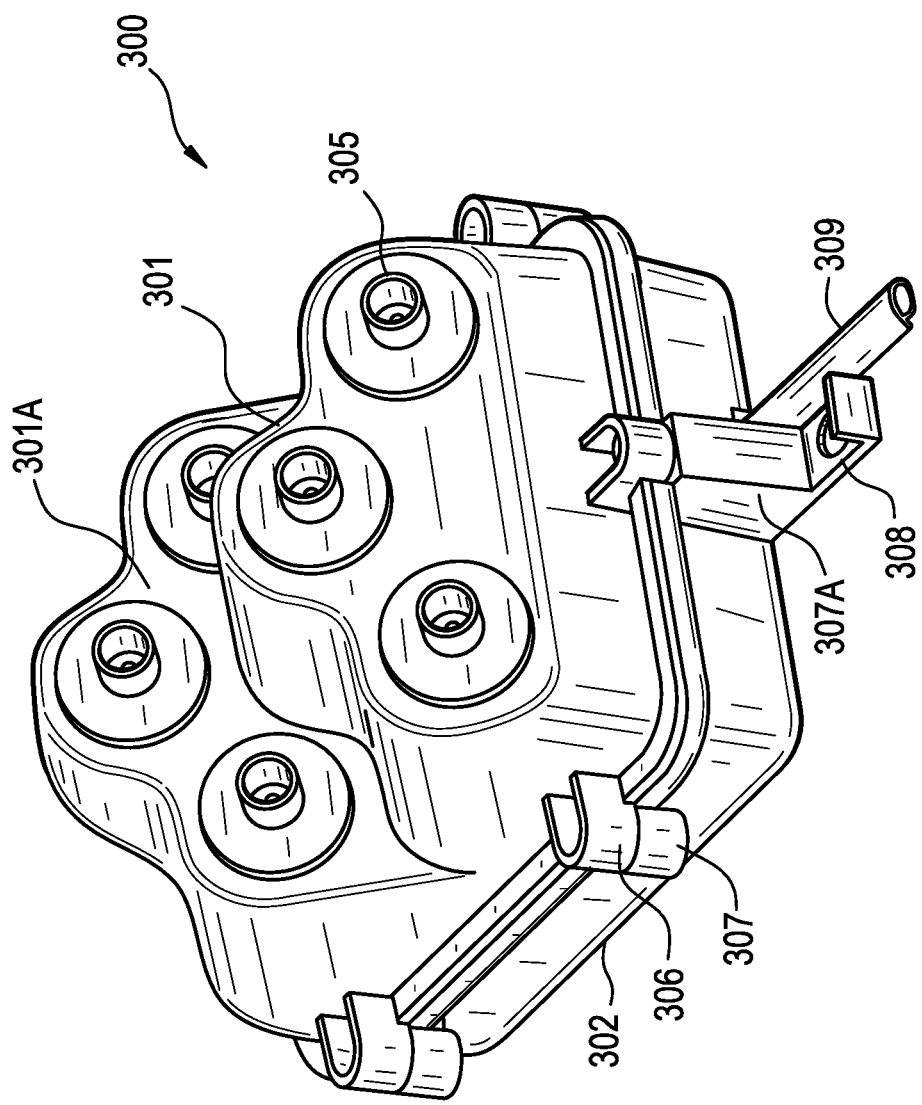
FIG. 9 shows a perspective view of a third exemplary embodiment of a fiber optic terminal enclosure.
Figure 10:
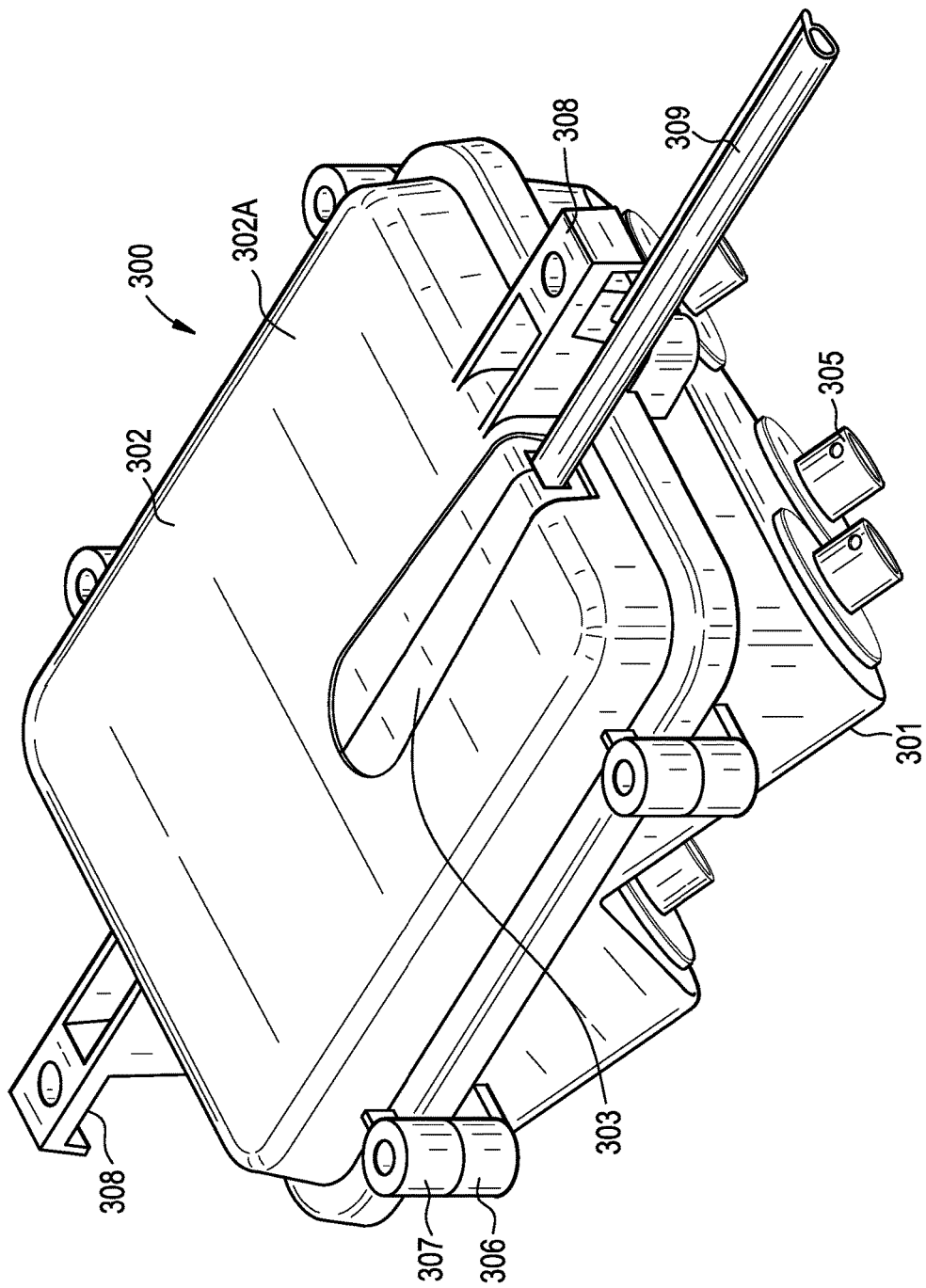
FIG. 10 shows a perspective bottom view of a third exemplary embodiment of a fiber optic terminal enclosure.
Figure 11:
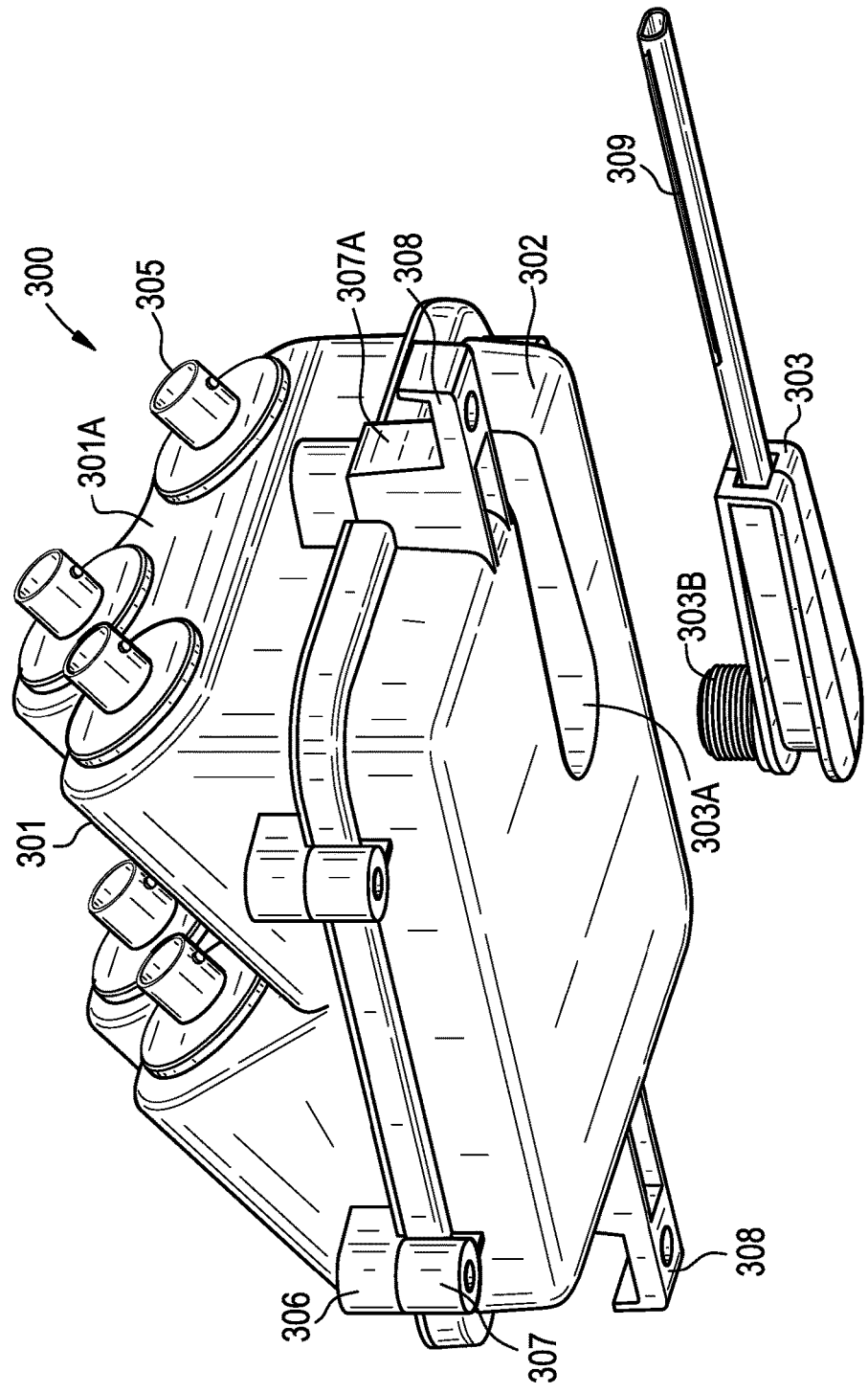
FIG. 11 shows a perspective view of a third exemplary embodiment of a fiber optic terminal enclosure.
Figure 12:
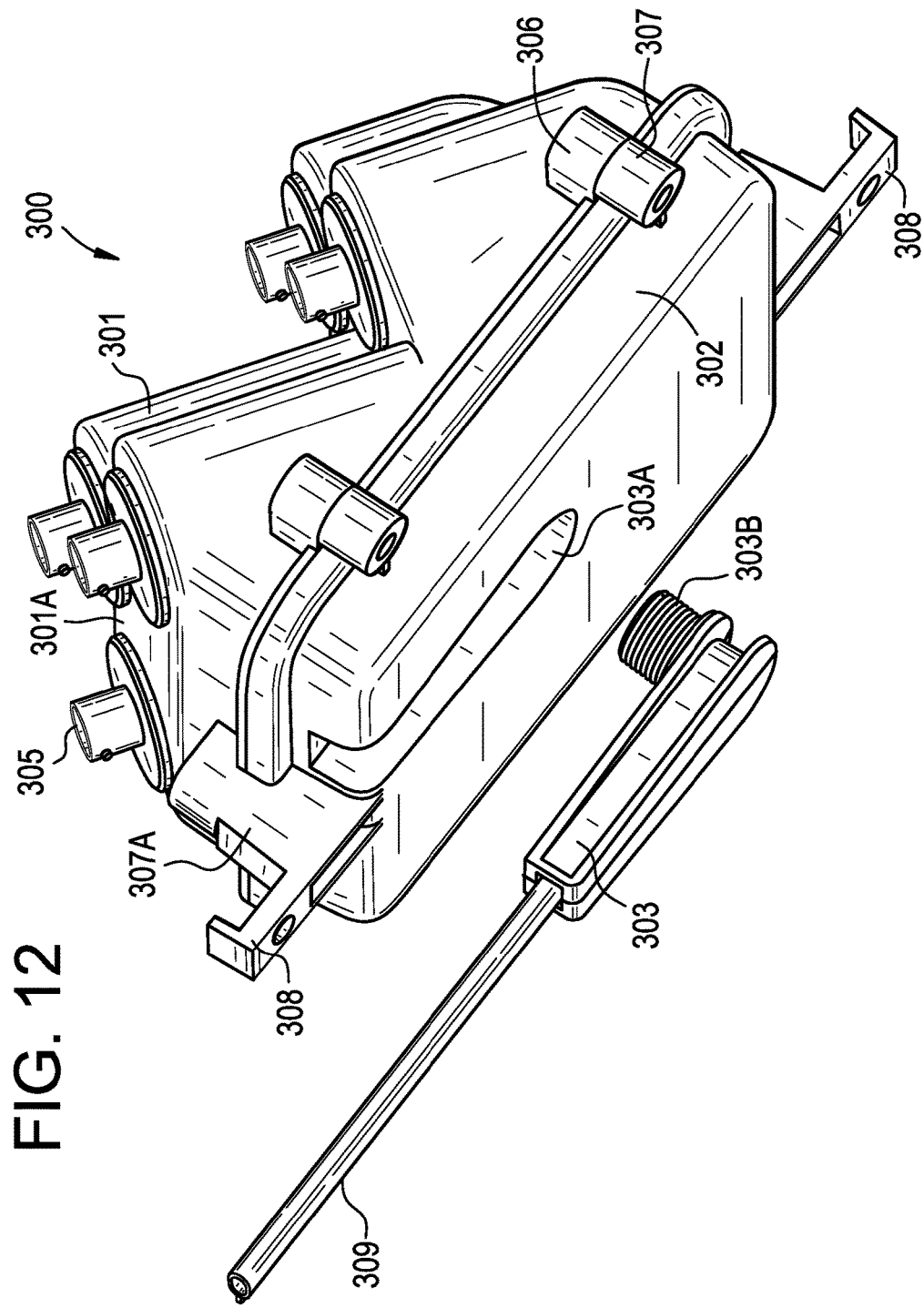
FIG. 12 shows a perspective view of a third exemplary embodiment of a fiber optic terminal enclosure.
Figure 13A:
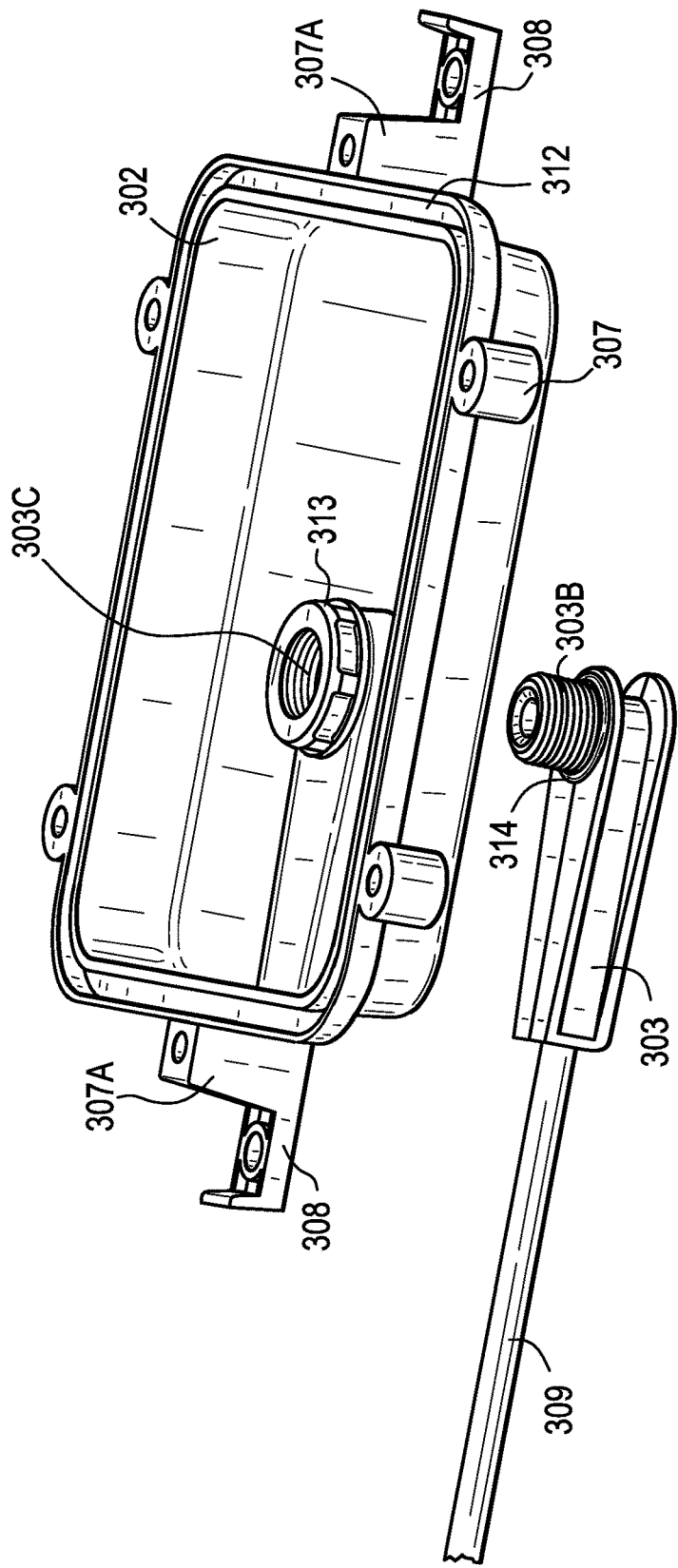
FIGS. 13A and 13B show perspective views of the terminal base and right angle transition body of a third exemplary embodiment of a fiber optic terminal enclosure.
Figure 13B:
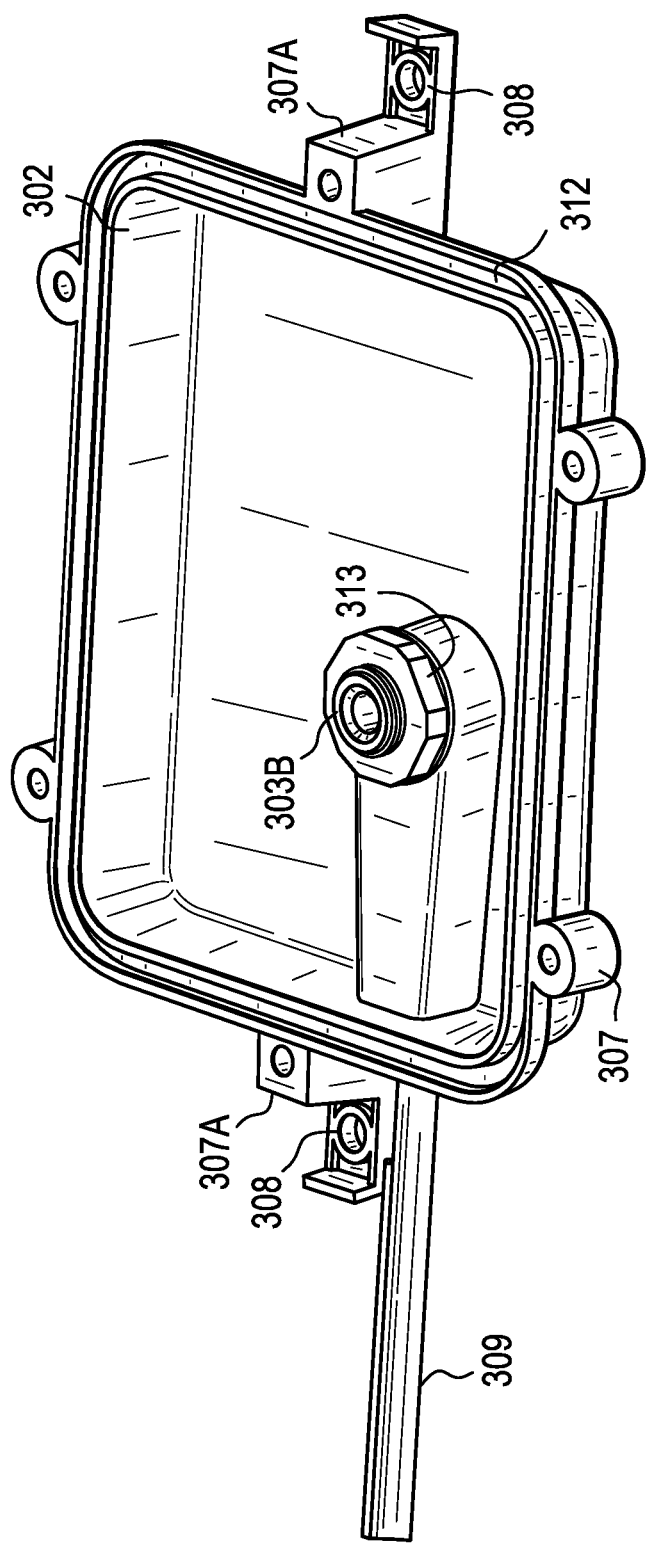
Figure 16:
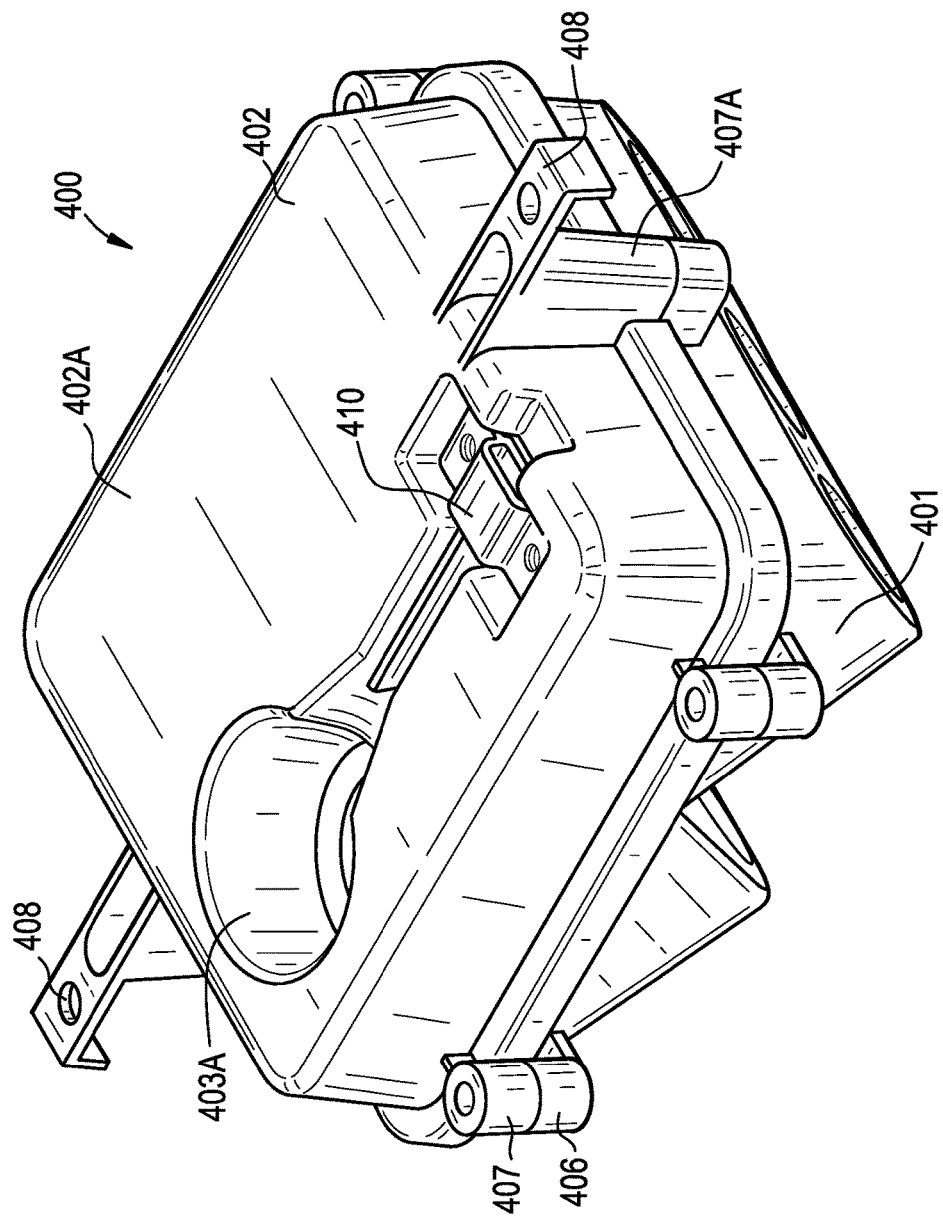
FIG. 16 shows a perspective bottom view of a fourth exemplary embodiment of a fiber optic terminal enclosure.
Figure 17C:
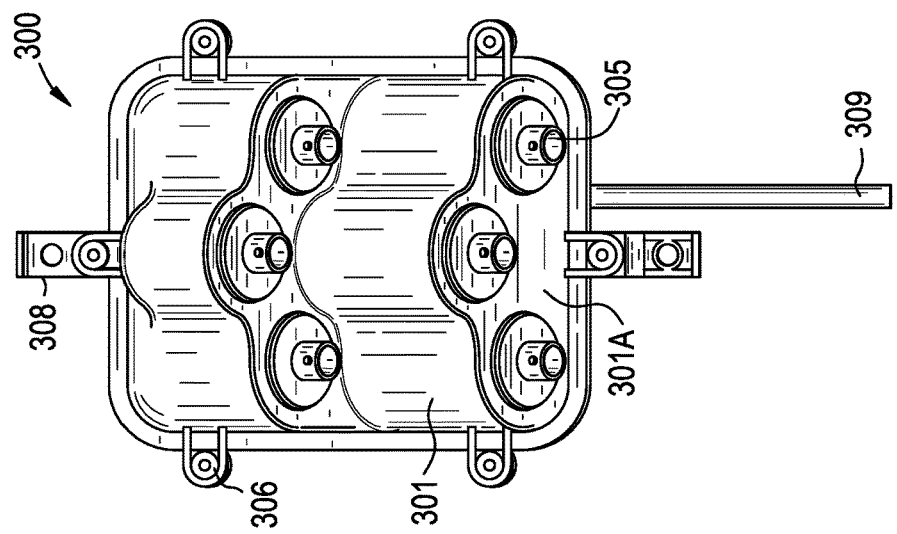
FIG. 17C shows a perspective top view of a third exemplary embodiment of a fiber optic terminal enclosure.
Figure 17B:
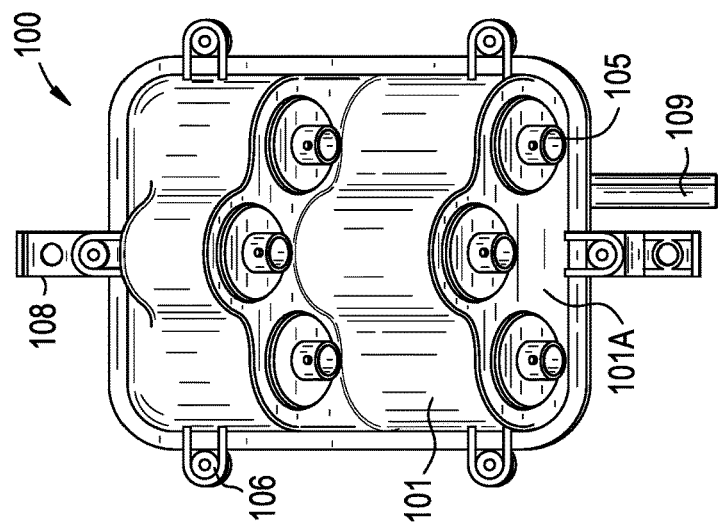
FIG. 17B shows a perspective top view of a first exemplary embodiment of a fiber optic terminal enclosure.
Figure 17A:
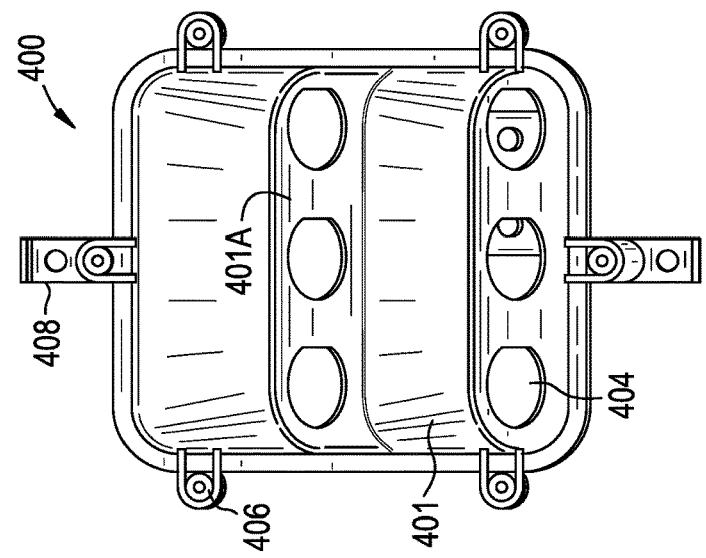
FIG. 17A shows a perspective top view of a fourth exemplary embodiment of a fiber optic terminal enclosure.

FIGS. 1B and 8 show of a second exemplary embodiment of a fiber optic terminal enclosure 200. The fiber optic terminal enclosure 200 is similar to fiber optic terminal enclosure 100, except that it includes more ports. The fiber optic terminal enclosure 200 includes a twelve port terminal lid 201 and a terminal base 202. The twelve port terminal lid 201 of the fiber optic terminal enclosure 200 includes twelve holes 204, in adaptor mounting faces 201A, into which HFOAs 205 are mounted. The adaptor mounting surfaces are formed at an angle α between 0 and 180 degrees, preferably in a range between 30 and 60 degrees and more preferably at approximately 45 degrees, from a plane formed where twelve port terminal lid 201 and terminal base 202 meet, to allow for easy access and cable management. The holes 204 in each adaptor mounting surfaces 201A are staggered to make access easier. The twelve port terminal lid 201 also includes fastener shrouds 206. The twelve port terminal lid 201 also includes an O-ring retainer similar to O-ring retainer 111.

The terminal base 202 includes fastener bosses 207 and 207A. Conventional fasteners (not shown) can be used to attach the twelve port terminal lid 201 to the terminal base 202 at the fastener shrouds 206 and fastener bosses 207, 207A. The terminal base 202 also includes mounting tabs 208 that can be used to mount the fiber optic terminal enclosure 200 to other structures, such as a wall or pole, with conventional fasteners (not shown). The terminal base 202 also includes an O-ring groove similar to O-ring groove 112. Thus, an O-ring (not shown) may be placed in the O-ring groove before attaching the twelve port terminal lid 201 to the terminal base 202, and the O-ring retainer will hold the O-ring in place such that an appropriate environmental seal can be formed.

The terminal base 202 also includes a pocket similar to pocket 103A for a right angle transition body similar to right angle transition body 103. The pocket may also include a space for a locking clamp similar to locking clamp 110 that can be used to attach a flat drop cable similar to flat drop cable 109 to the terminal base 202. In a preferred embodiment, said pocket is deep enough so that said right angle transition body does not extend beyond a plane formed at the bottom (202A) of said terminal base 202.

The fiber optic terminal enclosure 200 may be made of thermoplastic materials, such as polycarbonates or polypropylene, or other like materials.

Cross sectional views of fiber optic terminal enclosure 200 would be similar to FIGS. 3 and 5.

FIGS. 9, 10, 11, 12, 13A, 13B, 17C, 18C, 18F, 18I, 19C and 19 show views of a third exemplary embodiment of a fiber optic terminal enclosure 300. The fiber optic terminal enclosure 300 includes a six port terminal lid 301 and a terminal base 302. The six port terminal lid 301 of the fiber optic terminal enclosure 300 includes six holes 304 (see FIG. 19C), in adaptor mounting faces 301A, into which HFOAs 305 are mounted. The adaptor mounting surfaces are formed at an angle α between 0 and 180 degrees, preferably in a range between 30 and 60 degrees and more preferably at approximately 45 degrees, from a plane where six port terminal lid 301 and terminal base 302 meet (see FIG. 18F), to allow for easy access and cable management. The holes 304 in each adaptor mounting surfaces 301A are staggered to make access easier. The six port terminal lid 301 also includes fastener shrouds 306. The six port terminal lid 301 also includes an O-ring retainer similar to O-ring retainer 111.

The terminal base 302 includes fastener bosses 307 and 307A. Conventional fasteners (not shown) can be used to attach the six port terminal lid 301 to the terminal base 302 at the fastener shrouds 306 and fastener bosses 307, 307A. The terminal base 302 also includes mounting tabs 308 that can be used to mount the fiber optic terminal enclosure 300 to other structures, such as a wall or pole, with conventional fasteners (not shown). The terminal base 302 also includes an O-ring groove 312. Thus, an O-ring (not shown) may be placed in the O-ring groove 312 before attaching the six port terminal lid 301 to the terminal base 302, and the O-ring retainer will hold the O-ring in place such that an appropriate environmental seal can be formed.

The terminal base 302 also includes a pocket 303A for a right angle transition body 303. In a preferred embodiment, said pocket 303A is deep enough so that said right angle transition body 303 does not extend beyond a plane formed at the bottom (302A) of said terminal base 302.

The right angle transition 303 has a first threaded end 303B that is inserted into a hole 303C in the terminal base 302. A nut 313 can be threaded on the threaded end 303B to attach the right angle transition body 303 to the terminal base 302. Also, an O-ring 314 may be place around the threaded end 303B to improve the environmental seal.

FIGS. 14A, 14B, 15A and 15B show views of right angle transition 303 and flat drop cable 309. The right angle transition 303 includes two body halves 303-1 and 303-2 that may be held together by tabs/holes 303D. Flat drop cable 309 may include strength members 309E and a buffer tube 309D including optical fibers 309A. The optical fibers 309A go through a furcation tube organizer block 309C. At the end of flat drop cable 309 are connectors 309B that are inserted into HFOAs 305. In one embodiment, the right angle transition body 303 has a wedge-like shape.

In addition, epoxy or other suitable materials may be used to fill the right angle transition body 303 to provide water blocking and cable retention.

The fiber optic terminal enclosure 300 may be made of thermoplastic materials, such as polycarbonates or polypropylene, or other like materials.

FIGS. 16, 17A, 18A, 18D, 18G, 19A and 19D show views of a fourth exemplary embodiment of a fiber optic terminal enclosure 400. This enclosure is similar fiber optic terminal enclosure 100, except that the holes 404 in each of the adaptor mounting surfaces 401A are not staggered. The fiber optic terminal enclosure 400 includes a six port terminal lid 401 and a terminal base 402. The six port terminal lid 401 of the fiber optic terminal enclosure 400 includes six holes 404 (see FIG. 19A), in adaptor mounting faces 401A, into which hardened HFOAs similar to HFOAs 105 (not shown) are mounted. The adaptor mounting surfaces 401A are formed at an angle α between 0 and 180 degrees, preferably in a range between 30 and 60 degrees and more preferably at approximately 45 degrees, from a plane formed where six port terminal lid 401 and terminal base 402 meet (see FIG. 18D), to allow for easy access and cable management. The six port terminal lid 401 also includes fastener shrouds 406. The six port terminal lid 401 also includes an O-ring retainer similar to O-ring retainer 111 (not shown).

The terminal base 402 includes fastener bosses 407 and 407A. Conventional fasteners (not shown) can be used to attach the six port terminal lid 401 to the terminal base 402 at the fastener shrouds 406 and fastener bosses 407, 407A. The terminal base 402 also includes mounting tabs 408 that can be used to mount the fiber optic terminal enclosure 400 to other structures, such as a wall or pole, with conventional fasteners (not shown). The terminal base 402 also includes an O-ring groove similar to O-ring groove 112 (not shown). Thus, an O-ring (not shown) may be placed in the O-ring groove before attaching the six port terminal lid 401 to the terminal base 402, and the O-ring retainer will hold the O-ring in place such that an appropriate environmental seal can be formed.

The terminal base 402 also includes a pocket 403A for a right angle transition body similar to right angle transition body 103 (not shown). The pocket 403A may also include a space for a locking clamp similar to locking clamp 410 that can be used to attach a flat drop cable similar to flat drop cable 109 (not shown) to the terminal base 402. In a preferred embodiment, said pocket 403A is deep enough so that said right angle transition body 403 does not extend beyond a plane formed at the bottom (402A) of said terminal base 402.

The fiber optic terminal enclosure 400 may be made of thermoplastic materials, such as polycarbonates or polypropylene, or other like materials.

Cross sectional views of fiber optic terminal enclosure 400 would be similar to FIGS. 3 and 5.

In addition, epoxy or other suitable materials may be used to fill the right angle transition body 103 to provide water blocking and cable retention.

As mentioned above, although the exemplary embodiments described above are various undersea housings the general inventive concept should not be limited thereto, and it could also apply to other types of housings. For example, the enclosure is not limited to lids with six or twelve holes for HFOAs.

The invention claimed is:

1. A terminal enclosure comprising:
   a terminal base with a hole;
   a terminal lid with an adapter mounting face and a mounting hole in said adapter mounting face;
   a right angle transition body with a first end and a second end;
   an adapter which passes through said mounting hole and is mounted to said adapter mounting face; and
   a fiber optic cable, attached to said second end of said right angle transition body, with an optical fiber with a connector at one end;
   wherein said adapter mounting face is formed at an angle α, between 0 and 180 degrees, from a plane formed where said terminal lid and said terminal base meet;
   wherein said optical fiber connector is connected to said adapter;
   wherein said first end of said right angle transition body passes through said terminal base hole;
   wherein said terminal base and terminal lid are configured to be attached together; and
   wherein said terminal base has a pocket and said right angle transition body is positioned in said terminal base pocket.

2. The terminal enclosure of claim 1 further comprising:
   a plurality of mounting faces on said terminal lid, each of said mounting faces comprises a plurality of mounting holes; and
   a plurality of adapters passing through said mounting holes and mounted to said adapter mounting faces.

3. The terminal enclosure of claim 1 wherein said right angle transition body comprises two body halves.

4. The terminal enclosure of claim 3 wherein said right angle transition body has a wedge-like shape.

5. The terminal enclosure of claim 1 wherein said adapter is a hardened fiber optic adapter.

6. The terminal enclosure of claim 1 wherein said fiber optic cable comprises a furcation tube organizer block.

7. The terminal enclosure of claim 1 wherein said angle α is approximately 45 degrees.

8. The terminal enclosure of claim 1 wherein said angle α is in a range between approximately 30 and 60 degrees.

9. The terminal enclosure of claim 1 wherein said right angle transition body does not extend beyond a plane formed at the bottom of said terminal base.

* * * * *